(12) United States Patent
Valluri et al.

(10) Patent No.: US 12,166,772 B2
(45) Date of Patent: Dec. 10, 2024

(54) SYNERGISTIC DNS SECURITY UPDATE

(71) Applicant: Cisco Technology, Inc., San Jose, CA (US)

(72) Inventors: Vamsidhar Valluri, Santa Clara, CA (US); Vinay Prabhu, Milpitas, CA (US); Sarah Adelaide Evans, San Jose, CA (US); Suraj Rangaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/817,724

(22) Filed: Aug. 5, 2022

(65) Prior Publication Data
US 2022/0377089 A1    Nov. 24, 2022

Related U.S. Application Data

(62) Division of application No. 16/567,435, filed on Sep. 11, 2019, now Pat. No. 11,411,967.

(60) Provisional application No. 62/774,102, filed on Nov. 30, 2018.

(51) Int. Cl.
*H04L 9/40* (2022.01)
*H04L 45/00* (2022.01)
*H04L 61/4511* (2022.01)

(52) U.S. Cl.
CPC ........ *H04L 63/1416* (2013.01); *H04L 45/563* (2013.01); *H04L 61/4511* (2022.05); *H04L 63/0227* (2013.01); *H04L 63/0272* (2013.01); *H04L 63/101* (2013.01); *H04L 63/20* (2013.01)

(58) Field of Classification Search
CPC ............. H04L 63/1416; H04L 61/4511; H04L 45/563; H04L 63/0227; H04L 63/0272; H04L 63/101; H04L 63/20
USPC .............................. 709/223, 224, 203; 726/1
See application file for complete search history.

(56) References Cited

U.S. PATENT DOCUMENTS

| | | | |
|---|---|---|---|
| 6,886,044 B1 * | 4/2005 | Miles ..................... | G06Q 30/06 709/227 |
| 9,473,528 B2 * | 10/2016 | Zuk ...................... | H04L 63/1408 |
| 10,015,180 B1 * | 7/2018 | Heuser ................ | H04L 61/4511 |
| 10,728,287 B2 * | 7/2020 | Foxhoven ............... | H04L 63/08 |
| 2009/0228577 A1 * | 9/2009 | Webb-Johnson ....... | H04L 63/20 709/221 |

(Continued)

OTHER PUBLICATIONS

International Search Report and Written Opinion from the International Searching Authority, mailed Feb. 7, 2020, 13 pages, for pages, for corresponding International Patent Application No. PCT/US2019/061966.

(Continued)

*Primary Examiner* — Kaylee J Huang
(74) *Attorney, Agent, or Firm* — Polsinelli P.C.

(57) ABSTRACT

Systems and methods provide for synergistic domain name system DNS security updates for an enterprise network operating under a Software Defined Wide Area Network (SD-WAN). A system may be configured to collect positive and/or negative unified threat defense (UTD) results, deploy a rules-based model that, when a threat or clearance is detected across several SD-WAN edge network devices, triggers an update to a local security blacklist/whitelist, wherein the update comprises a signature, and push the update to other devices that have not yet seen the threat or clearance.

20 Claims, 10 Drawing Sheets

(56) References Cited

U.S. PATENT DOCUMENTS

| | | | |
|---|---|---|---|
| 2013/0247167 A1* | 9/2013 | Paul | H04L 63/0263 |
| | | | 726/11 |
| 2014/0359761 A1 | 12/2014 | Altman et al. | |
| 2015/0195291 A1 | 7/2015 | Zuk et al. | |
| 2015/0312214 A1* | 10/2015 | Windsor | H04L 51/04 |
| | | | 726/12 |
| 2016/0036816 A1* | 2/2016 | Srinivasan | H04L 63/1425 |
| | | | 726/1 |
| 2016/0050224 A1 | 2/2016 | Ricafort et al. | |
| 2016/0057167 A1* | 2/2016 | Bach | H04L 63/101 |
| | | | 726/23 |
| 2016/0323302 A1 | 11/2016 | Teixeira et al. | |
| 2017/0134428 A1* | 5/2017 | Vazquez Carames | H04L 63/20 |
| 2018/0176139 A1 | 6/2018 | Mortensen et al. | |
| 2019/0012456 A1 | 1/2019 | Moore et al. | |
| 2019/0130440 A1 | 5/2019 | Qiu et al. | |
| 2021/0112079 A1 | 4/2021 | Trapero et al. | |

OTHER PUBLICATIONS

Krishnan, Prabhakar, et al., "A Multi Plane Network Monitoring and Defense Framework for Sdnoperational Security," ARPN Journal of Engineering and Applied Science, Jun. 12, 2017, pp. 3896-3902.
Verizon UK Ltd., "Clauses of 1-11 of Connection-Based Virtual Services," ETSI Draft; NFVEVE(18)000139, European Telecommunications Standards Institute (ETSI), Oct. 21, 2018, 52 pages.
Juniper Networks, "EANTC Independent Test Report: Juniper Contrail SD-WAN Solution," Sep. 1, 2018, 14 pages.

* cited by examiner

SYNERGISTIC DNS SECURITY UPDATE

CROSS-REFERENCE TO RELATED APPLICATIONS

This application is a divisional of U.S. Non-Provisional patent application Ser. No. 16/567,435, filed on Sep. 11, 2019, which claims the benefit of priority to U.S. Provisional Patent Application No. 62/774,102, filed on Nov. 30, 2018, all of which are hereby expressly incorporated herein by reference in its entirety and for all purpose.

FIELD

The present embodiments generally relate to systems and methods that provide for synergistic Domain Name System (DNS) security updates in a network based on threat detection via local security policies on edge network devices.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined wide-area network (SD-WAN) solutions have been developed to address these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

To secure the SD-WAN, a cloud-delivered secure internet gateway can be used to provide the first line of defense against threats on the Internet. The cloud-delivered secure internet gateway can include a Domain Name System (DNS) security platform, a hierarchical decentralized naming system for computers, services, or other resources connected to the Internet or a private network. The DNS associates a variety of information with domain names assigned to each of the participating entities. Most prominently, it translates more readily memorized domain names to the numerical IP addresses needed for locating and identifying computer services and devices with the underlying network protocols.

DNS security platforms, like Cisco Umbrella, can deliver complete visibility into Internet activity across all devices on a network and block threats before they reach the network. The DNS security platform can stop phishing, malware infections, and proactively block requests to malicious destinations before a connection is established. More specifically, the DNS delegates the responsibility of assigning domain names and mapping those names to Internet resources by designating authoritative name servers for each domain. Network administrators may delegate authority over sub-domains of their allocated name space to other name servers. This mechanism provides distributed and fault-tolerant service and was designed to avoid a single large central database.

Various DNS security platforms (e.g., Cisco Umbrella, OpenDNS, etc.) provide additional security features on top of the DNS. In many cases, these DNS security platforms may be provided as a cloud service. These DNS security platforms may be configured to, for example, use the Internet's infrastructure to block malicious destinations before a connection is ever established. The platforms may use DNS to stop threats over all ports and protocols—even direct-to-IP connections. Instead of proxying all web traffic, the platforms may route requests to risky domains for deeper URL and file inspection. The platforms can effectively protect without delay or performance impact. Even if devices become infected in other ways, the platforms may prevent connections to attacker's servers. The platforms can further stop data exfiltration and execution of ransomware encryption.

DNS security platforms often rely on a remotely hosted source of truth that is periodically updated, and is not prepared to respond dynamically to emerging threats. For example, the DNS security platform may maintain a list of IPs and/or domains associated with threats, and once a flow has passed the security platform, it may be processed by a unified threat defense (UTD) policy, which detects threats based on the actual behavior of the application. The result of the computationally intensive UTD process is not used to update local or remote security DNS policy. The information generated by UTD is a very rich data set that, if collected directly, presents serious scale challenges.

DNS security platforms, like Umbrella, can each have its own logic for updating information about which URLs are associated with threats, such as having several other features, including IPS/IDS, app-firewall, and AMP that are much more computationally intensive, but also more accurate. Some hierarchical architectures allow for the aggregation of information across nodes about threats that have passed through the DNS security platform but have been flagged by other security features. Therefore it would be desirable and advantageous for a DNS security platform to be able to aggregated information to improve the responsiveness of all nodes in the network to emerging threats, to avoid duplicating computationally intensive security checks, and to improve the trust scores maintained by the remote server of DNS security platforms.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1A:
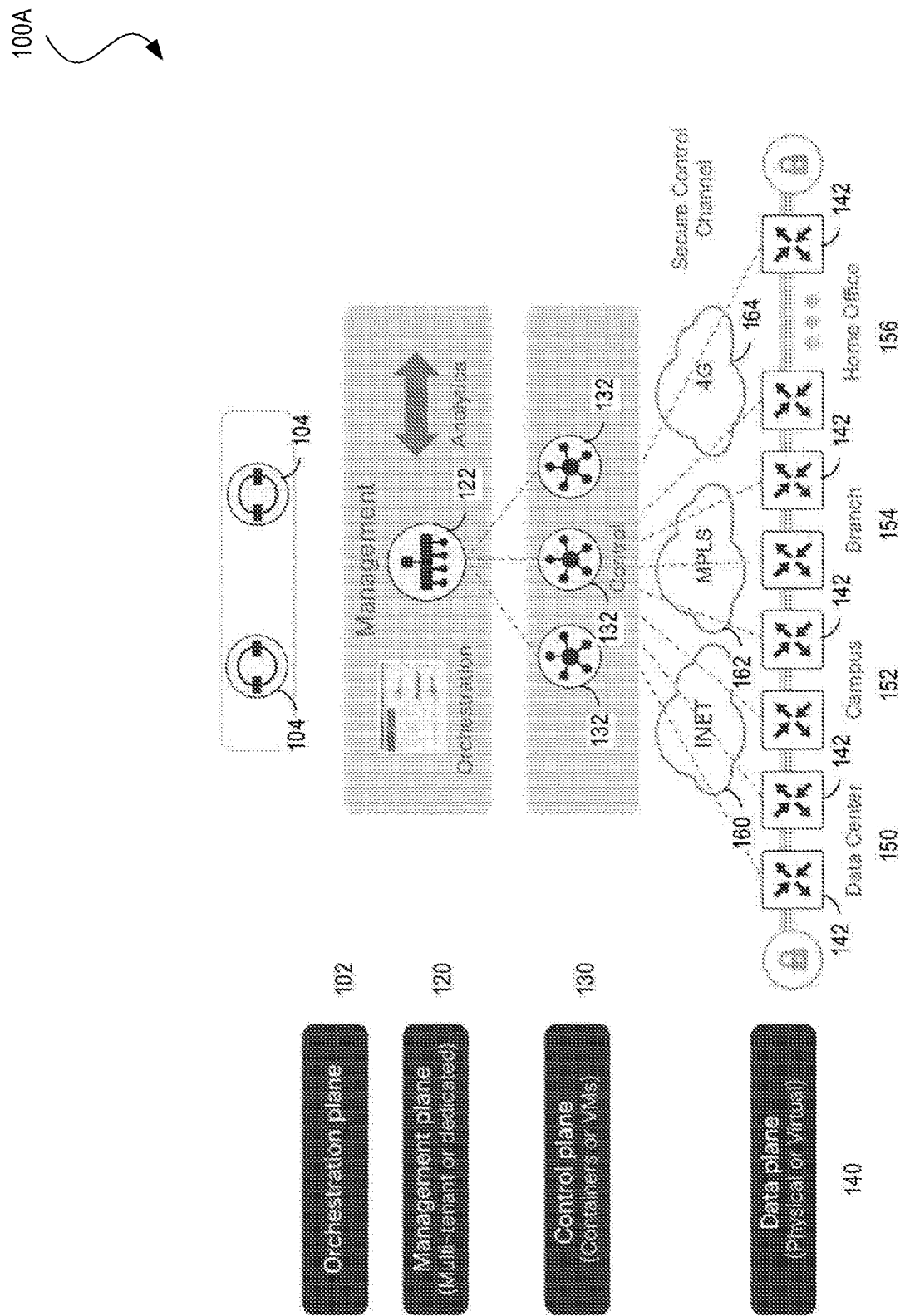
FIG. 1A illustrates an example of a high-level network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for synergistic DNS security updates. A system may be configured to collect negative unified threat defense (UTD) results, deploy a rules-based model that, when a threat is detected across several SD-WAN edges, triggers an update to a local security blacklist, wherein the update comprises a threat signature, and push the update to other devices that have not yet seen the threat.

A computer-implemented method, in accordance with one embodiment, can comprise receiving, via a network controller appliance 132 of a software-defined wide-area network (SD-WAN), an upstream update 107a from the edge network device 142a that comprises a threat signature 105 associated with a threat detected by the edge network device 142a; triggering a temporary update to add the detected treat as a negative unified threat defense (UTD) result in a local domain name system (DNS) blacklist; and pushing a downstream update 107b that comprises the threat signature 105 to a device group comprising other edge network devices 142b that have not yet seen the threat.

The computer-implemented method can further comprise deploying a rules-based model that the temporary update is triggered to add the detected threat to the local DNS blacklist when the threat is detected across several edge network devices 142. The detected threat can be detected by a locally-implemented advanced security policy 103b on the edge network device and was not detected by an associated cloud security system 101 having a domain name system security platform. The locally-implemented advanced security policy 103b can be one of the following policies: Unified Threat Defense (UTD), IPSec/SSL Intrusion Detection and Prevention System (IPS/IDS), Advanced Malware Protection (AMP), Anti-virus Protection (AV), Data Loss Prevention (DLP), Application Firewall (AppFW), or Encrypted Traffic Analytics (ETA). The other edge network devices 142b can be associated with a partner VPN of the edge network device 142a.

The computer-implemented method can further comprise collecting a stream of negative unified threat defense (UTD) results at the network controller appliance 132; and sending a pre-processed and condensed DNS blacklist associated with the stream of negative UTD results to the associated cloud security system 101. The upstream and downstream updates can be new message types in an address family in OMP messages. The device group is limited to other edge network devices in the SD-WAN that do not have locally-implemented advanced security policies 103b enabled. The threat signature 105 can comprise protocol header fields including an IP address, port, protocols, and other attributes including packet length.

A system, in accordance with one embodiment, can comprise one or more processors; and one or more non-transitory computer-readable media that include computer-readable instructions stored thereon that are executable by the one or more processors to perform or control performance of operations, the operations comprising: receive, via a network controller appliance 132 of a software-defined wide-area network, an upstream update 107a from an edge network device 142a that comprises a threat signature 105 associated with a threat detected by the edge network device 142a; trigger a temporary update to add the detected treat as a negative unified threat defense (UTD) result in a local domain name system (DNS) blacklist; push a downstream update 107b that comprises the threat signature 105 to other edge network devices 142b that have not yet seen the threat.

An edge network device 142, in accordance with one embodiment, can comprise one or more processors; and one or more non-transitory computer-readable media that include computer-readable instructions stored thereon that are executable by the one or more processors to perform or control performance of operations, the operations comprising: query a local domain name system (DNS) blacklist/whitelist on the edge network device 142 regarding a domain; push, in response to a first answer that the domain is not on the local DNS blacklist/whitelist, a query regarding the domain to an advanced DNS security 414 at the associated cloud security system 101; query, in response to a second answer that the domain is cleared at the advanced DNS security 414, a locally-implemented advanced securities policy 103b on the edge network device 142; detect the threat or clearance regarding an associated domain via the locally-implemented advanced securities policy 103b; and send the upstream update 107a from the edge network device 142 that includes the signature 105 associated with the detected threat or clearance to the network controller appliance 132 of a software-defined wide-area network. The operations of the edge network device 142 can further comprise the following steps: notify the associated cloud security system 101 to update its DNS blacklist/whitelist with respect to the threat; and receive an update from the network controller appliance 132 to void the detected threat and place the domain on the local DNS whitelist.

Example Embodiments

FIG. 1A illustrates an example of a network architecture 100A for implementing aspects of the present technology. An example of an implementation of the network architecture 100A is the Cisco® Software Defined Wide Area Network (SD-WAN) architecture. However, one of ordinary skill in the art will understand that, for the network architecture 100A and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100A can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 1B:
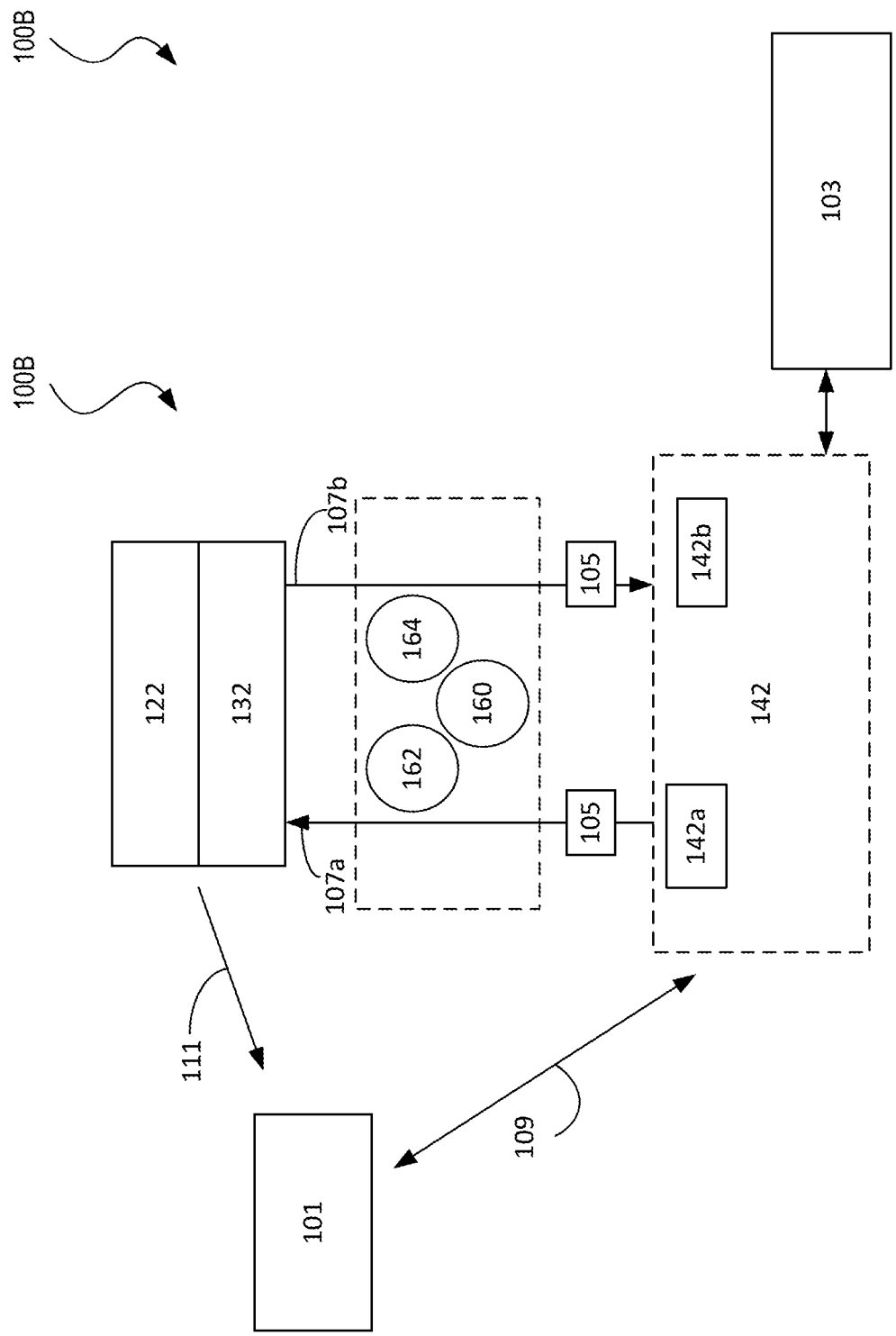
FIG. 1B illustrates an example of a high-level architecture of a DNS security system in accordance with an embodiment.

FIG. 1B illustrates a network architecture 100B including a DNS cloud security system 101 configured to operate with the network architecture 100A. The edge network devices 142 (142a, 142b) can have various locally-implemented security services 103. For example, the edge network device 142 can implement a local domain name system (DNS) blacklist/white list 103a as a basic DNS security policy, which can also allow customization that is specific to a particular enterprise. The various locally-implemented security services 103 can include more locally-implemented advanced security policies 103b, such as Unified Threat Defense (UTD), IPSec/SSL Intrusion Detection and Prevention System (IPS/IDS), Advanced Malware Protection (AMP), Anti-virus Protection (AV), data loss prevention (DLP), Application Firewall (AppFW), Encrypted Traffic Analytics (ETA), etc., which can be embedded and enabled on selected edge network devices 142 based on platform capabilities. These advanced security policies can identify threats that the cloud security service 101 may not have identified as threats. Also, the DNS cloud security system 101 can occasionally update 109 the UTD policies on the edge network devices 142. Edge network devices 142 with advanced DNS security 414 can redirect DNS requests to internet domains (local domains may be bypassed) to the DNS cloud security system 101 when the edge network devices 142 are subjected to DNS security checks and valid/non-malicious domains will receive the resolved IP addresses as a DNS response. The DNS cloud security system 101 may give a proxy IP address if the DNS cloud security system 101 wants to subject application traffic to additional security checks. When Application security via Tunnels is configured on the edge network devices 142, then selected Application traffic (Direct Internet Access traffic) received on the edge network devices 142 can be tunneled to the DNS cloud security system 101 for additional security functions like Firewall, IPS and others.

In addition, the network controller appliance 132 can collect negative or positive UTD results and intermittently send a pre-processed and condensed DNS blacklist/whitelist 111 to the DNS cloud security system 101 for use in enriching and updating trustworthiness scores.

The one or more network controller appliances 132 may be configured to manage the network architecture 100A and may be responsible for managing all control and data policies by using special Overlay Management Protocol (OMP), as discussed in greater detail further below. Threats can be detected by the locally-implemented security services 103, where a threat signature 105 can be sent upstream via an upstream OMP message 107a to the network controller appliances 132. The network controller appliances 132 can add the threat signature 105 (may be specific to the enterprise it is serving) and can push the threat signature 105 downstream via a downstream OMP message 107b propagating to other edge network devices 142b. The upstream and downstream OMP messages 107a, 107 can be new message types in an address family in the OMP messages. The other edge network devices 142b may not have been capable of performing one or some of the advanced security policies, and may not have otherwise been able to detect such a threat.

By rerouting traffic away from security servers of the DNS cloud security system 101, this offers a better ability to scale the DNS cloud security system 101, wherein the SD-WAN specific network controller appliances layer 130 can take into consideration customer network topology, device type and capabilities, and applications seen on certain edge network devices 142. Threat signatures may comprise protocol header fields like IP addresses, ports, protocols, and/or other attributes like packet length. The edge network devices 142 receiving these threat signatures can use basic classification of the traffic using an access control list (ACL) and if a match is found, the edge network devices 142 can prevent the threat instead of redirecting the traffic to the DNS cloud security system 101, which saves bandwidth costs and improves scalability of the DNS cloud security system 101.

Additional details regarding the operation of the network architecture 100A are discussed in "Cisco® SD-WAN Design Guide," Cisco® Systems, Inc. (October 2018) and "Cisco® SD-WAN Deployment Guide," Cisco® Systems, Inc. (October 2018), which are incorporated herein by reference.

Figure 2:
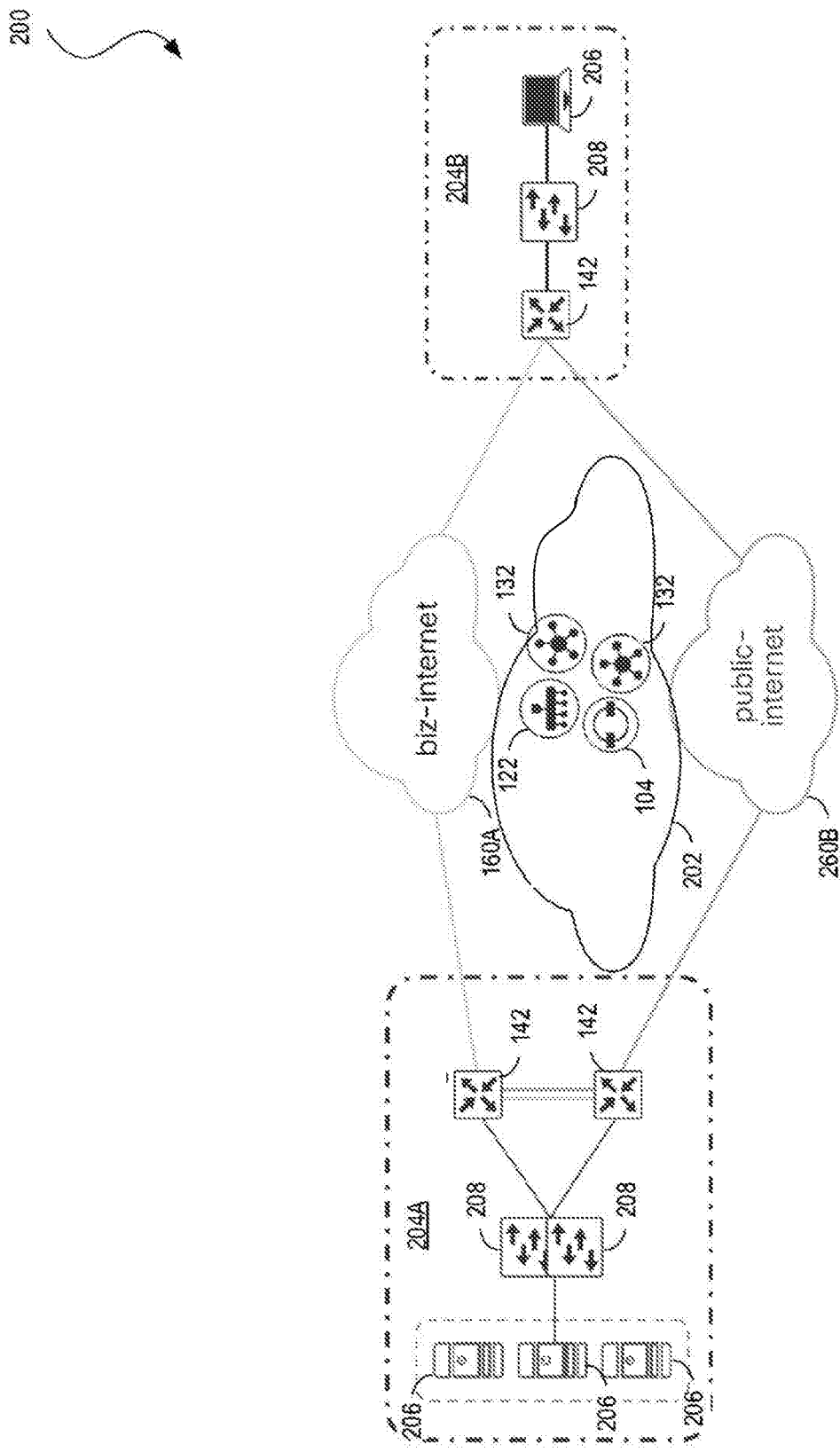
FIG. 2 illustrates an example of a network topology in accordance with an embodiment.

FIG. 2 illustrates an example of a network topology 200 for showing various aspects of the network architecture 100A. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 142 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
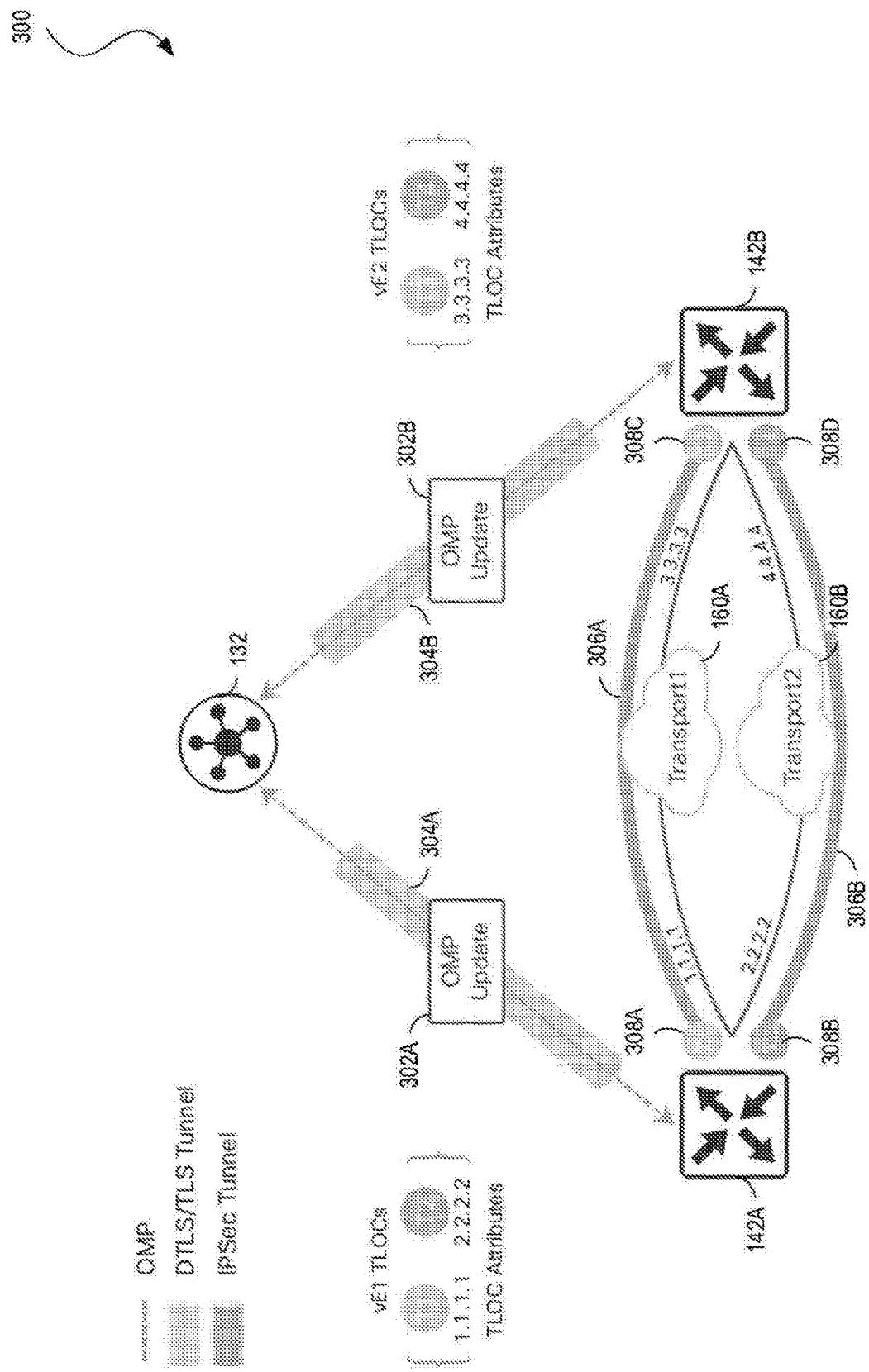
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages/updates can include new category of messages for Security and DNS threat is a sub-category of Security. The threat signature 105 detected by the edge network device 142*a*, 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them. Updates sent via the service routes are covered in the IPSec tunnels 306A and 306B. There are two types of updates when a local threat is detected: (1) flow level (optional)—a flow- or application-based local security threat propagation to avoid double inspection at multiple points in a flow path, and meta data in the form of MPLS label can be sent across the IPSec tunnels 306A and 306B at flow level to a far end to prevent from going through a policy chain again; (2) controller level—DNS updates are sent in OMP to the network controller appliance 132 so that other edge network devices 142 can be updated with their local caches with the threat information.

Figure 4A:
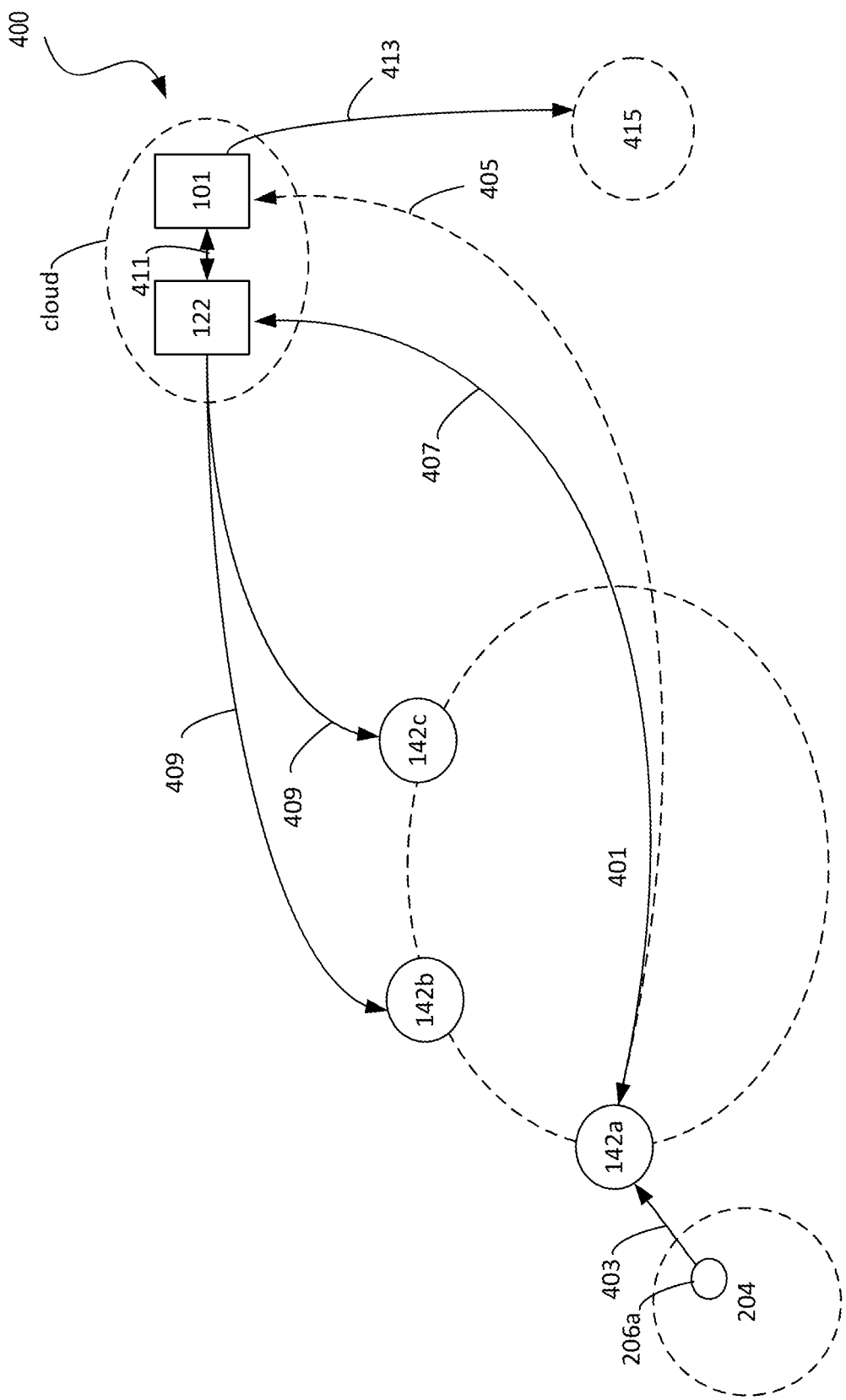
FIG. 4A illustrates a diagram of a Software-Define Wide Area Network (SD-WAN) showing how DNS security updates can be executed in a local Wide Area Network (WAN) in accordance with an embodiment.

FIG. 4A illustrates a diagram of a Software-Define Wide Area Network (SD-WAN) 400 showing how DNS security updates can be executed in a local Wide Area Network (WAN) 401 in accordance with an embodiment. In one embodiment, a first edge network device 142*a* in the local WAN 401 may be capable of subjecting traffic to a local domain name system (DNS) blacklist 103*a*, advanced DNS security 414 via the DNS cloud security system 101, and the locally-implemented advanced security policies 103*b*, whereas a second edge network device 142*b* may only capable of executing the local domain name system (DNS) blacklist 103*a*, and a third edge network device 142*c* may only capable of executing the local DNS blacklist/whitelist 103*a* and advanced DNS security 414 via the DNS cloud security system 101.

A user via an endpoint 206*a* can send a request 403 to the first edge network device 142*a* for accessing a particular domain wherein traffic associated with the domain can be subjected to the local DNS blacklist/whitelist 103*a* of the first edge network device 142*a* to query whether or not that domain is malicious. If the domain is listed in the local DNS blacklist 103*a*, then the traffic can be blocked, and if the domain is not listed, the edge network device 142*a* can push 405 the domain to the advanced DNS security 414 at the DNS cloud security system 101. If again the particular domain is not considered malicious, then, since the first edge network device 142*a* has locally-implemented advanced security policies 103*b*, the first edge network device 142*a* can subject the traffic to deeper security functions through the locally-implemented advanced security policies 103*b*. If the locally-implemented advanced security policies 103*b* find that the particular domain should be blocked, then the edge network device 142*a* can send an update 407 to the network management appliances 122.

The network management appliances 122 can check 411 with the DNS cloud security system 101 and determine whether or not the verdict of the locally-implemented advanced security policies 103*b* matches that of the advanced DNS security 414 at the DNS cloud security system 101. If it does not, the DNS cloud security system 101 can determine whether or not to updates its security policies. The advanced DNS security 414 can also indicate that the domain is cleared and add the domain to a whitelist. The network management appliances 122 can then propagate a security policy update 409, whether it is adding the domain to a blacklist or a whitelist, regarding the domain to the other edge network devices 142*b*, 12*bc* that do not have the capabilities of running the locally-implemented advanced security policies 103*b*. The DNS cloud security system 101 may also determine over time that the domain is no longer malicious and can update 411 the network management appliances 122 to propagate another security policy update 409 to the edge network devices 142. Furthermore, if the threat of the domain is severe enough, the DNS cloud security system 101 may send a security policy update 413 regarding the domain with respect to other networks 415 that it serves.

Figure 4B:
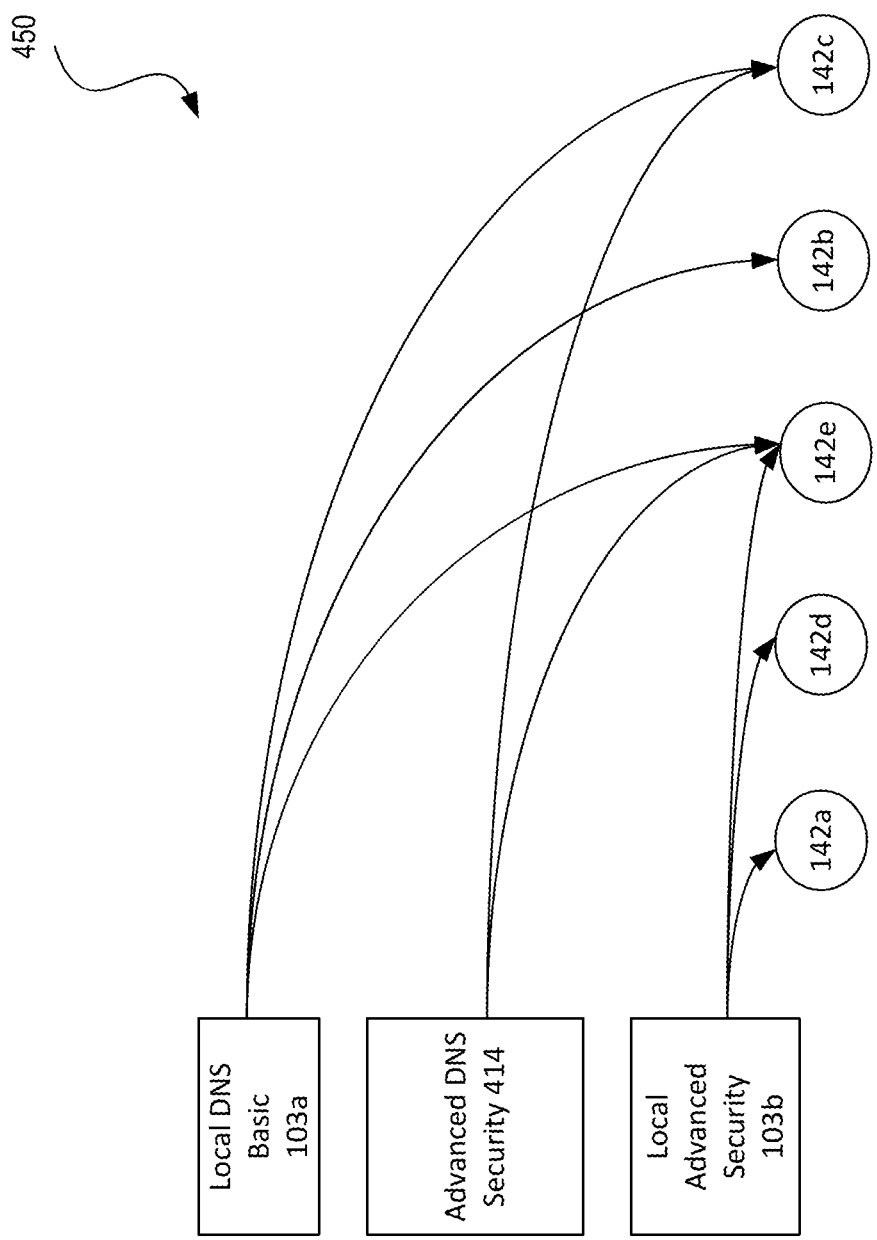
FIG. 4B illustrates a diagram showing a policy hierarchy of the security policies that can be executed on the edge network devices in accordance with an embodiment.

FIG. 4B illustrates a diagram 450 showing a policy hierarchy of the security policies that can be executed on the edge network devices 142 in accordance with an embodiment. For the edge network devices 142 that can execute the locally-implemented advanced security policies 103*b*, detected threats can be propagated to a particular device group, which can comprises all other edge network devices 142; only edge network devices 142*b*, 142*c* that do not have the locally-implemented advanced security policies 103*b* enabled; only edge network devices 142*b*, 142*c*, 142*e* that have the local DNS blacklist/whitelist 103*a* enabled; or any other customized subset of the edge network devices 142.

Figure 5A:
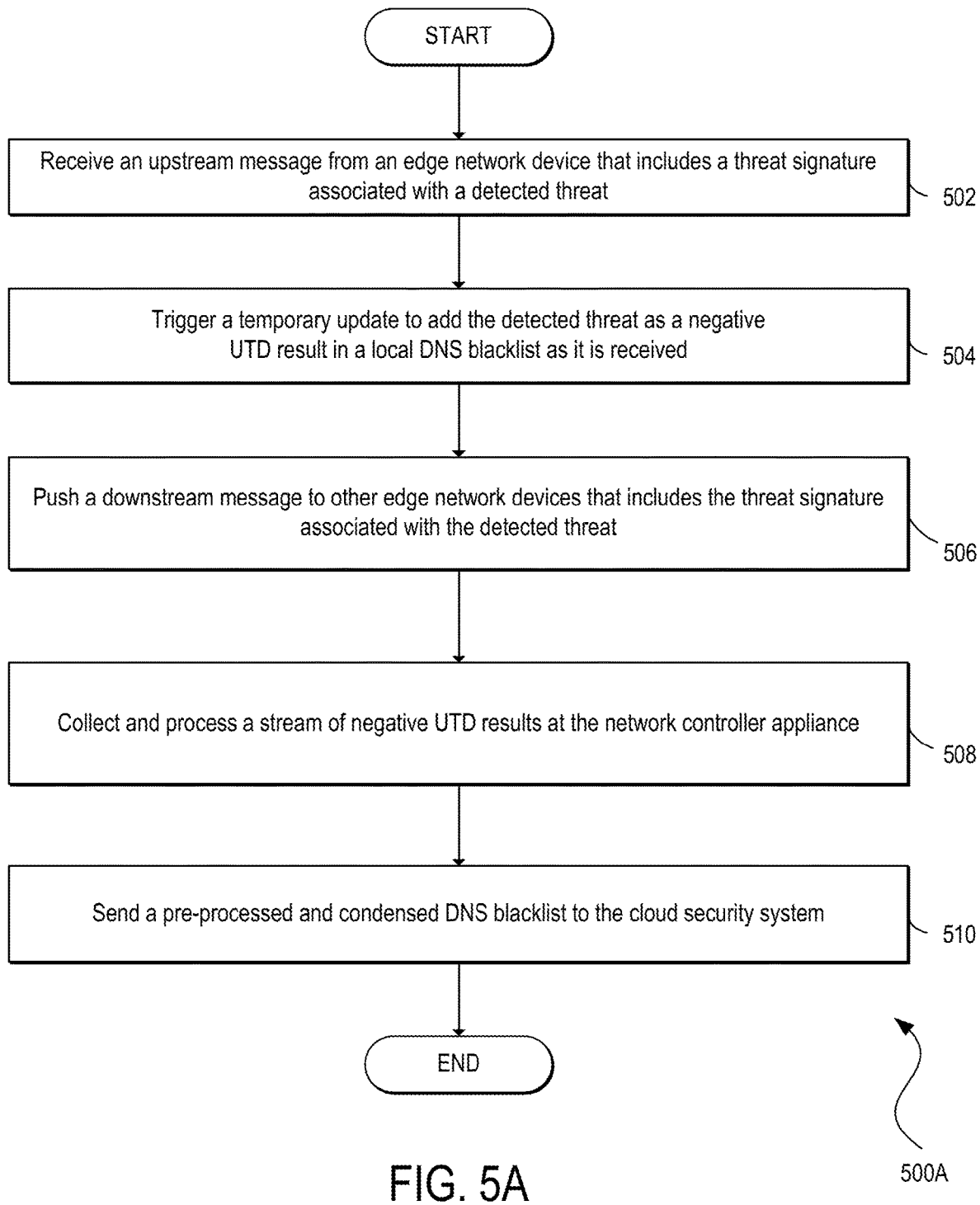
FIG. 5A illustrates an example of a flow diagram of a process for propagating security policies via the network controller appliances in the SD-WAN in accordance with an embodiment.
Figure 5B:
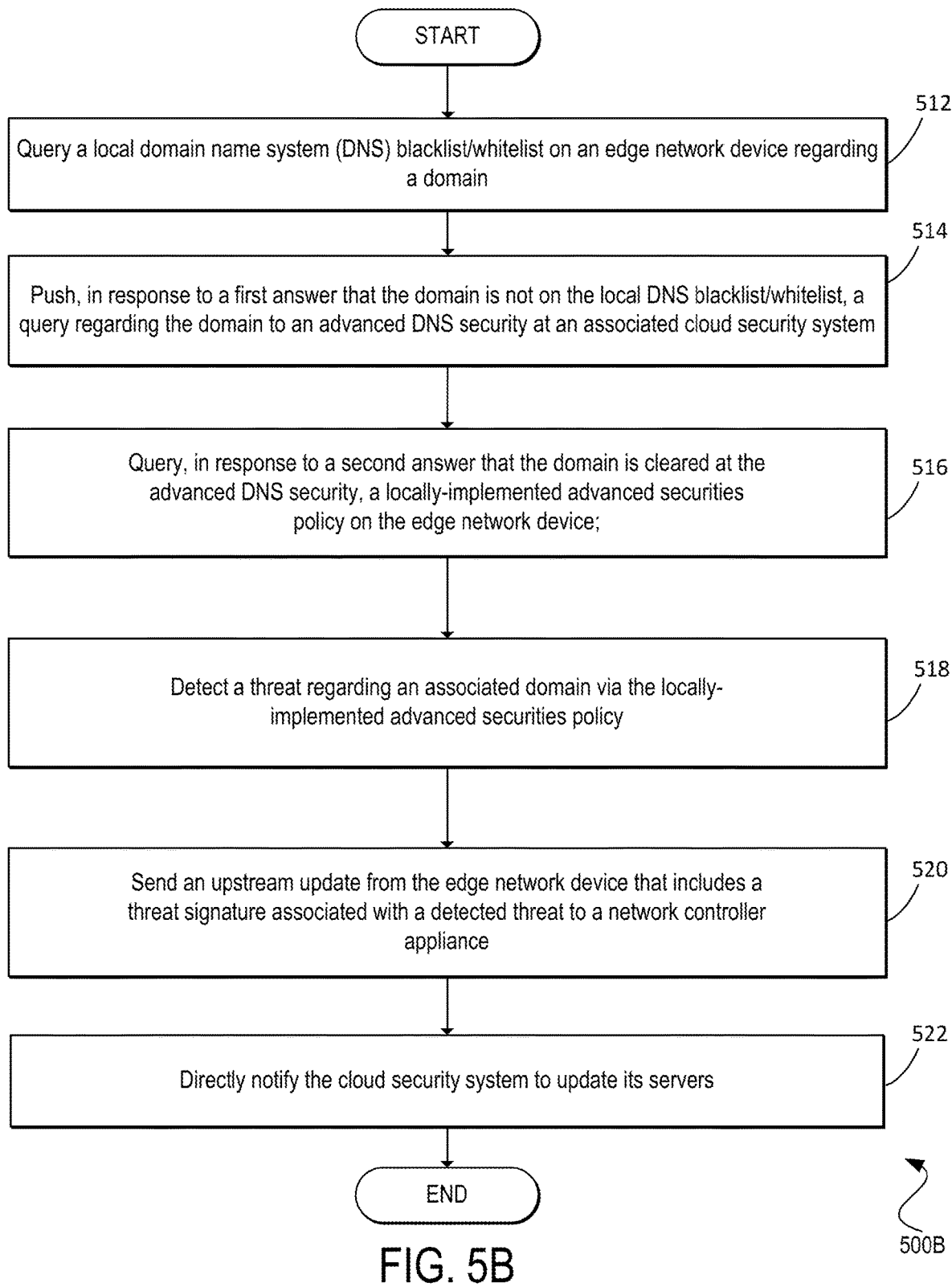
FIG. 5B illustrates another example of a flow diagram of a process for propagating security policies via the edge network devices in the SD-WAN in accordance with an embodiment.

FIGS. 5A and 5B illustrate examples of a flow diagram of processes 500A, 500B, respectively, for propagating security policies via SD-WAN in accordance with an embodiment. One of ordinary skill will understood that, for any processes discussed herein, there can be additional, fewer, or alternative steps performed in similar or alternative orders, or in parallel, within the scope of the various embodiments unless otherwise stated. For example, in step 502, one or more network controller appliances 132 can receive an upstream message 107*a* that can include a threat signature 105 associated with the threat detected by the locally-implemented advanced security policies 103*b* of the particular edge network device 142*a*. In order to improve response to emerging threats, in step 504, based on a deployed rules-based model, when the threat is detected across one or several edge network devices 142, a temporary update is triggered to add the threat as a negative UTD result collected by the network controller appliance 132 in a local DNS blacklist as the threats are received.

In step 506, the network controller appliance 132 can propagate and push the downstream messages 107*b* that can include the threat signature 105 of the learned threat to other edge network devices 142*b* and/or branches, in the same network or associated with a partner VPN, that have not detected that threat. Every edge network device 142 can send events related to threats it has detected to the network controller appliance 132. These events can be stored in an Elastic Search database and can be queried based on Device id, threat-id, IP addresses etc. The Elastic Search database can be used by the network controller appliance 132 to determine which edge network devices 142 have not reported this threat. For example, threat signatures 105 may be transmitted to all devices associated with a partner VPN. Thus, the one or more network controller appliances 132 (e.g., one or more instances of a controller located in the cloud) can enable edge-adjacent network-level monitoring and analytics.

In addition, the one or more network controller appliances 132 can operate as a buffer between the edge network devices 142 and central servers of the DNS cloud security system 101. In step 508, the network controller appliance 132 can collect and process a stream of negative UTD results and in step 509, send a pre-processed and condensed DNS blacklist to the DNS cloud security system 101 for use in enriching and updating trustworthiness scores. The network controller appliance 132 can maintain a list of Domains/Subdomains strings (keys) in a whitelist/blacklist and a changeset (new changes from the last sync with DNS cloud security system) with respect to DNS cloud security system 101. Only the changes from the previous Sync time will be sent to DNS cloud security system. This improves the response to new security threats and builds a scalable data pipeline. This can be leveraged across different customers to improve a centralized list of the DNS cloud security system 101 or leveraged in an analytics module used to identify threat patterns in various networks 100.

To propagate security policies with respect to the particular edge network device 142*a* the detected a threat or clearance, first in step 512, the edge network device 142*a* can query the local DNS blacklist/whitelist 103*a* on the edge network device 142*a* regarding a domain. In step 514, the edge network device 142*a* can push, in response to a first answer that the domain is not on the local DNS blacklist/whitelist 103*a*, a query regarding the domain to the advanced DNS security 414 at the DNS cloud security system 101. In step 516, the edge network device 142*a* can query, in response to a second answer that the domain is cleared at the advanced DNS security 414, a locally-implemented advanced securities policy on the edge network device. In step 518, the edge network device 142*a* can detect a threat regarding the domain via the locally-implemented advanced securities policy. In step 520, the particular edge network device 142*a* can send the upstream message 107*a* that can include the signature 105 associated with the threat or clearance detected by the edge network device 142*a* to the network controller appliance 132 of the software-defined wide-area network 400. Optionally, the edge network devices 142*a* can directly notify the DNS cloud security system 101 to update its servers.

Figure 6:
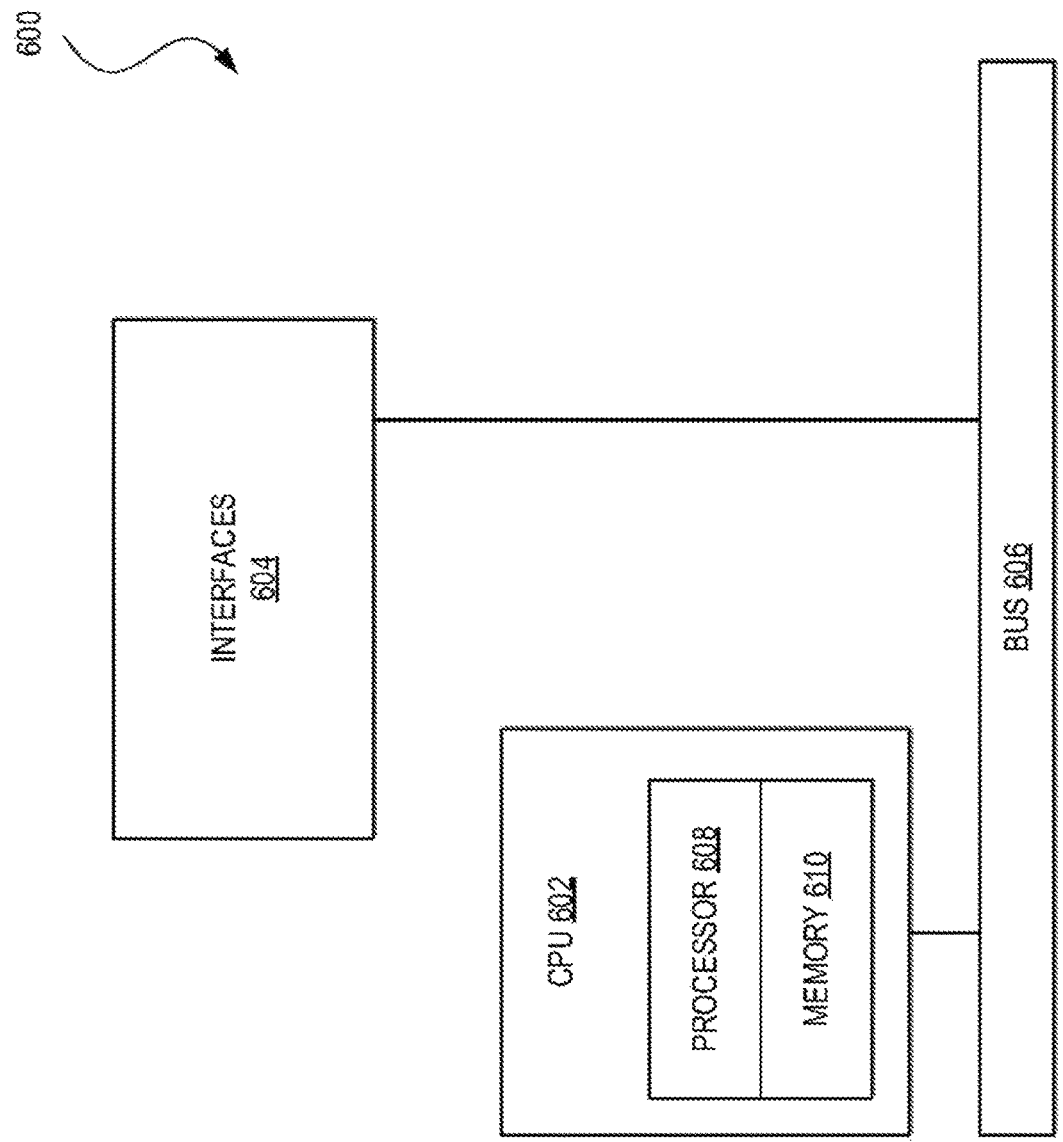
FIG. 6 illustrates an example of a network device in accordance with an embodiment.

FIG. 6 illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
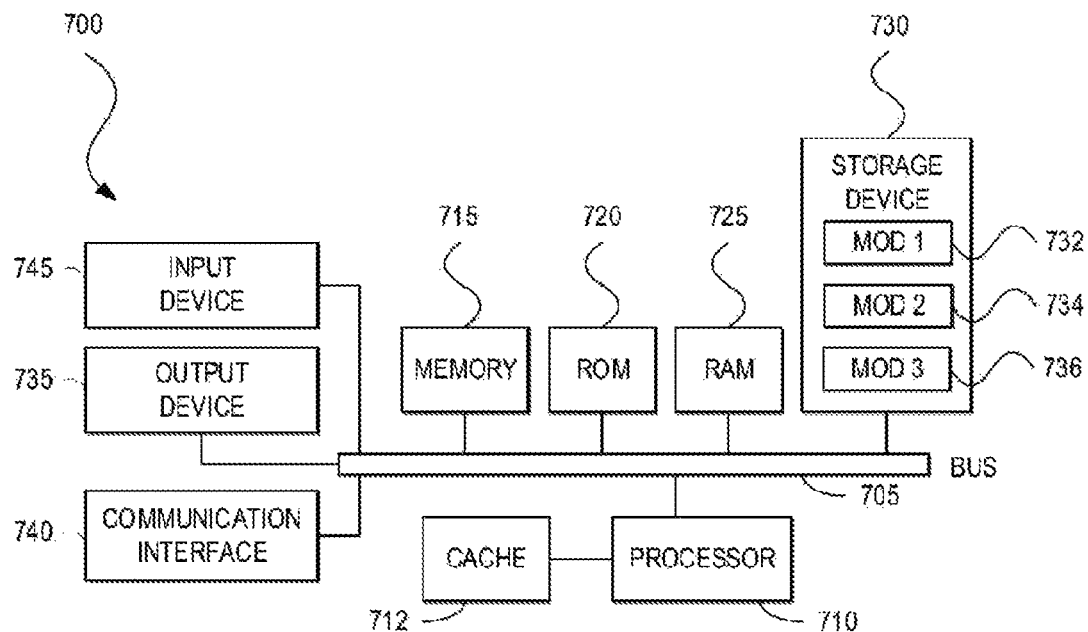
FIGS. 7A and 7B illustrate examples of systems in accordance with some embodiments.
Figure 7B:
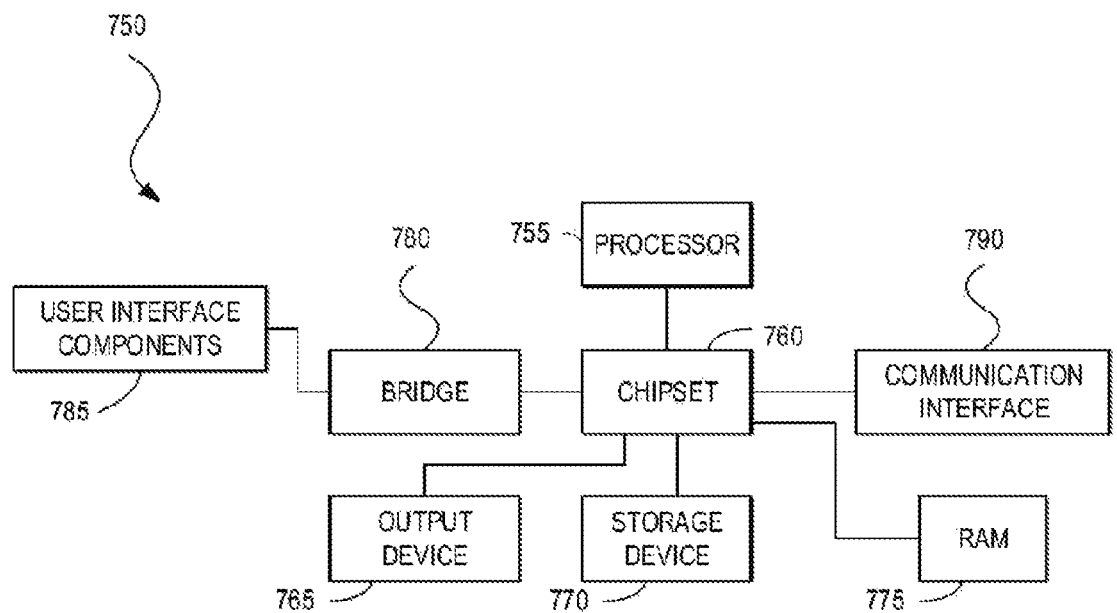

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. An edge network device, comprising:
   one or more processor; and
   one or more non-transitory computer-readable medium that include computer-readable instructions stored thereon, which when executed by the one or more processors, cause the one or more processors to:
   query, from the edge network device, a local domain name system (DNS) blacklist/whitelist regarding a domain;
   push, in response to a first answer that the domain is not on the local DNS blacklist/whitelist, a query, from the edge network device, regarding the domain to an advanced DNS security at an associated cloud security system;
   query, at the edge network device and in response to receiving a second answer that the domain is not malicious from the advanced DNS security at the associated cloud security system, a locally-implemented advanced securities policy implemented on the edge network device;
   detect, at the edge network device, a threat regarding the domain via the locally-implemented advanced securities policy; and
   in response to detecting the threat, send an upstream update including the threat from the edge network device to the associated cloud security system, wherein the upstream update enables the associated cloud security system to determine whether to update the advanced DNS security with the domain as the threat.

2. The edge network device of claim 1, wherein the upstream update includes a signature associated with the detected threat to a network controller appliance.

3. The edge network device of claim 2, wherein the network controller appliance is of a software-defined wide-area network.

4. The edge network device of claim 1, further comprising instructions which when executed by the one or more processors, causes the one or more processors to:
   notify the associated cloud security system to update a cloud DNS blacklist/whitelist with respect to the threat.

5. The edge network device of claim 1, further comprising instructions which when executed by the one or more processors, causes the one or more processors to:
   receive an update from a network controller appliance to void the detected threat and, in response to the detected threat being void, place the domain on the local DNS whitelist.

6. The edge network device of claim 5, wherein the locally-implemented advanced security policy is one of the following policies: Unified Threat Defense (UTD), IPSec/SSL Intrusion Detection and Prevention System (IPS/IDS), Advanced Malware Protection (AMP), Anti-virus Protection (AV), Data Loss Prevention (DLP), Application Firewall (AppFW), or Encrypted Traffic Analytics (ETA).

7. The edge network device of claim 1, wherein the upstream update is an Overlay Management Protocol (OMP) message.

8. A method comprising:
querying, at an edge network device, a local domain name system (DNS) blacklist/whitelist regarding a domain;
pushing, in response to a first answer that the domain is not on the local DNS blacklist/whitelist and by the edge network device, a query regarding the domain to an advanced DNS security at an associated cloud security system;
querying, at the edge network device and in response to receiving a second answer that the domain is not malicious from the advanced DNS security at the associated cloud security system, a locally-implemented advanced securities policy implemented on the edge network device;
detecting, at the edge network device, a threat regarding the domain via the locally-implemented advanced securities policy; and
in response to detecting the threat, sending an upstream update including the threat from the edge network device to the associated cloud security system, wherein the upstream update enables the associated cloud security system to determine whether to update the advanced DNS security with the domain as the threat.

9. The method of claim 8, wherein the upstream update includes a signature associated with the detected threat to a network controller appliance.

10. The method of claim 9, wherein the network controller appliance is of a software-defined wide-area network.

11. The method of claim 8, further comprising:
notifying the associated cloud security system to update a cloud DNS blacklist/whitelist with respect to the threat.

12. The method of claim 8, further comprising:
receiving an update from a network controller appliance to void the detected threat and, in response to the detected threat being void, place the domain on the local DNS whitelist.

13. The method of claim 12, wherein the locally-implemented advanced security policy is one of the following policies: Unified Threat Defense (UTD), IPSec/SSL Intrusion Detection and Prevention System (IPS/IDS), Advanced Malware Protection (AMP), Anti-virus Protection (AV), Data Loss Prevention (DLP), Application Firewall (AppFW), or Encrypted Traffic Analytics (ETA).

14. The method of claim 8, wherein the upstream update is an Overlay Management Protocol (OMP) message.

15. One or more non-transitory computer-readable mediums that include computer-readable instructions stored thereon, which when executed by one or more processors of an edge network device, cause the edge network device to:
query, on the edge network device, a local domain name system (DNS) blacklist/whitelist regarding a domain;
push, in response to a first answer that the domain is not on the local DNS blacklist/whitelist and from the edge network device, a query regarding the domain to an advanced DNS security at an associated cloud security system;
query, at the edge network device and in response to receiving a second answer that the domain is not malicious from the advanced DNS security at the associated cloud security system, a locally-implemented advanced securities policy implemented on the edge network device;
detect, at the edge network device, a threat regarding the domain via the locally-implemented advanced securities policy; and
in response to detecting the threat, send an upstream update including the threat from the edge network device to the associated cloud security system, wherein the upstream update enables the associated cloud security system to determine whether to update the advanced DNS security with the domain as the threat.

16. The one or more non-transitory computer-readable mediums of claim 15, wherein the upstream update includes a signature associated with the detected threat to a network controller appliance of a software-defined wide-area network.

17. The one or more non-transitory computer-readable mediums of claim 15, further comprising instructions which when executed by the one or more processors, causes the one or more processors to:
notify the associated cloud security system to update a cloud DNS blacklist/whitelist with respect to the threat.

18. The one or more non-transitory computer-readable mediums of claim 15, further comprising instructions which when executed by the one or more processors, causes the one or more processors to:
receive an update from a network controller appliance to void the detected threat and, in response to the detected threat being void, place the domain on the local DNS whitelist.

19. The one or more non-transitory computer-readable mediums of claim 18, wherein the locally-implemented advanced security policy is one of the following policies: Unified Threat Defense (UTD), IPSec/SSL Intrusion Detection and Prevention System (IPS/IDS), Advanced Malware Protection (AMP), Anti-virus Protection (AV), Data Loss Prevention (DLP), Application Firewall (AppFW), or Encrypted Traffic Analytics (ETA).

20. The one or more non-transitory computer-readable mediums of claim 15, wherein the upstream update is an Overlay Management Protocol (OMP) message.

* * * * *